Figure 1:
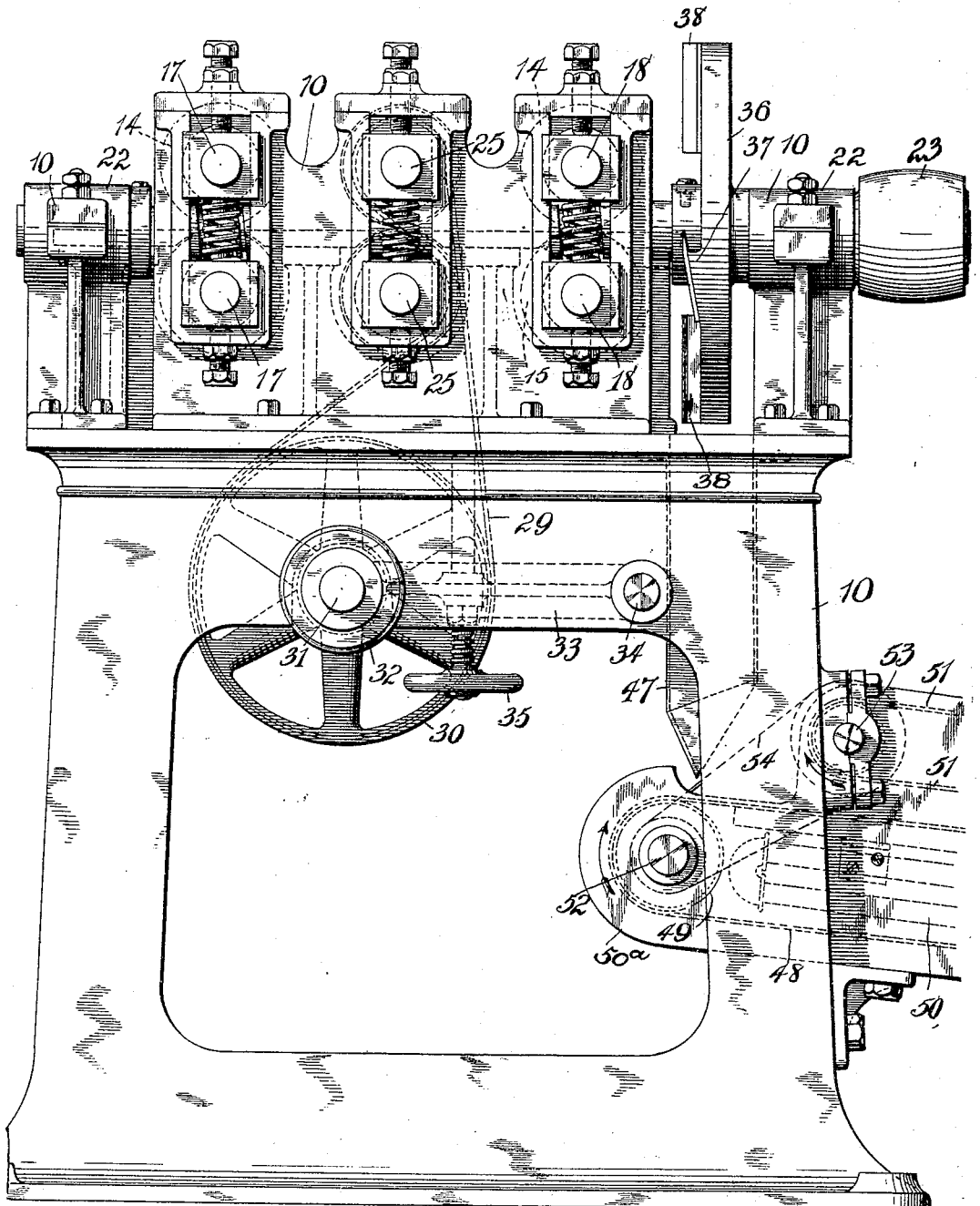

No. 773,570. PATENTED NOV. 1, 1904.
W. F. HUTCHINSON.
TOOTHPICK MACHINE.
APPLICATION FILED APR. 14, 1903. RENEWED APR. 1, 1904.
NO MODEL. 3 SHEETS—SHEET 1.

WITNESSES: INVENTOR
William F. Hutchinson,
BY
W. B. Hutchinson,
ATTORNEY

No. 773,570. PATENTED NOV. 1, 1904.
W. F. HUTCHINSON.
TOOTHPICK MACHINE.
APPLICATION FILED APR. 14, 1903. RENEWED APR. 1, 1904.
NO MODEL. 3 SHEETS—SHEET 2.
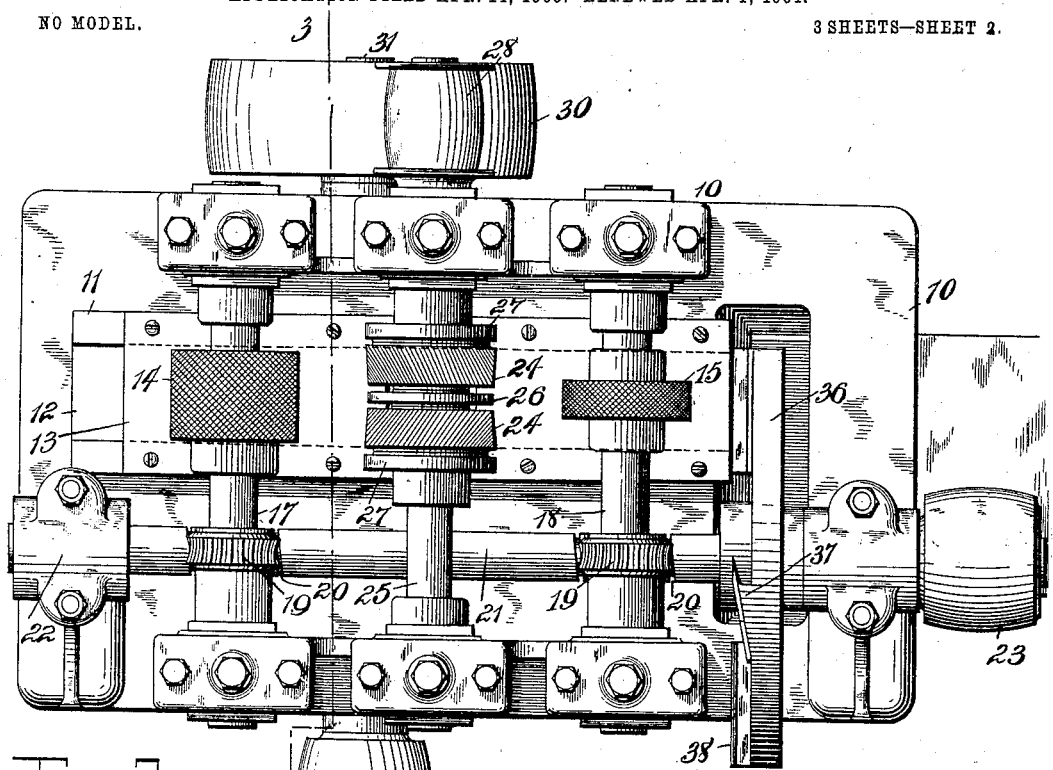
Fig. 2.
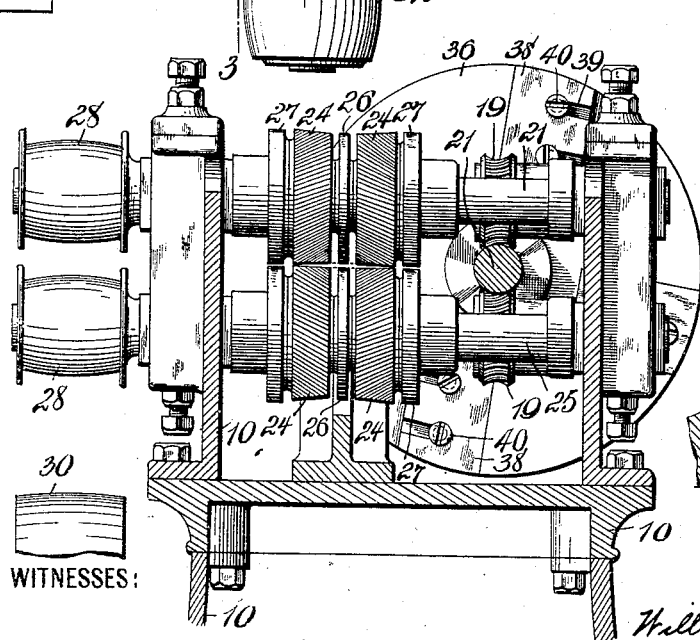
Fig. 3.
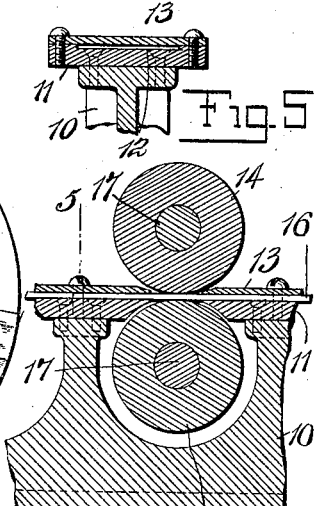
Fig. 5.
Fig. 4.
WITNESSES:
Wm H Canfield
F. S. Dunbar
INVENTOR
William F. Hutchinson,
BY
W. B. Hutchinson,
ATTORNEY

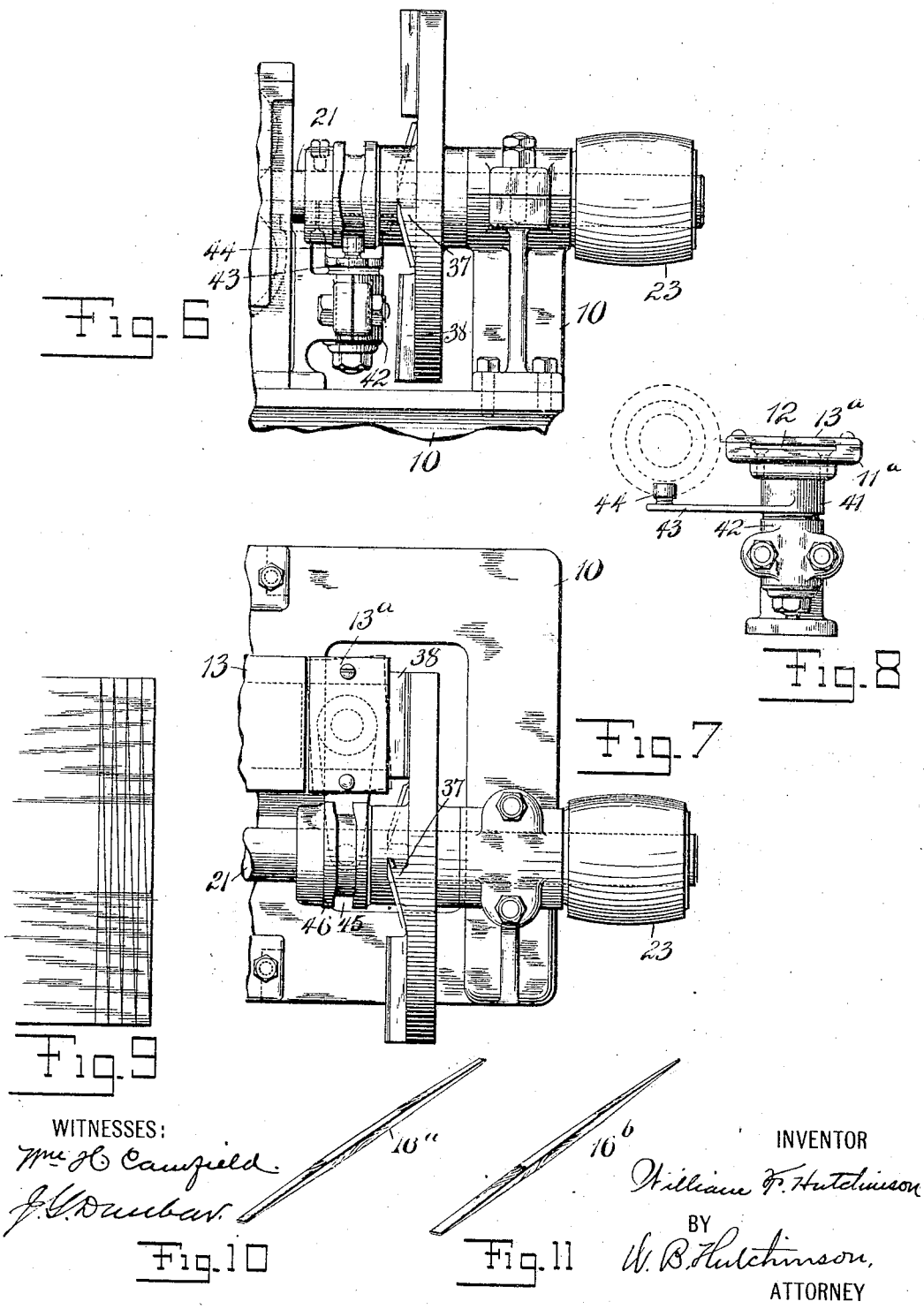

No. 773,570.

Patented November 1, 1904.

UNITED STATES PATENT OFFICE.

WILLIAM F. HUTCHINSON, OF NYACK, NEW YORK, ASSIGNOR TO NYACK MACHINE WORKS, OF NYACK, NEW YORK, A CORPORATION OF NEW YORK.

TOOTHPICK-MACHINE.

SPECIFICATION forming part of Letters Patent No. 773,570, dated November 1, 1904.

Application filed April 14, 1903. Renewed April 1, 1904. Serial No. 201,117. (No model.)

*To all whom it may concern:*

Be it known that I, WILLIAM F. HUTCHINSON, of Nyack, Rockland county, New York, have invented certain new and useful Improvements in Toothpick-Machines, of which the following is a full, clear, and exact description.

My invention relates to improvements in machines for cutting toothpicks and other articles.

The object of my invention is to produce a simple form of machine which is adapted to work rapidly and to cut a better and smoother toothpick or other article than is usually produced by ordinary methods.

My invention also has for an object the rumbling and polishing of the said articles as they are cut and also the drying of them, so that the finished product may be delivered smooth, polished, and ready for packing.

Still another object of my invention is to make a machine adjustable, so as to cut toothpicks or similar things of different styles or shapes.

With these ends in view my invention consists of certain features of construction and combinations of parts, which will be hereinafter described and claimed.

Reference is to be had to the accompanying drawings, forming part of this specification, in which similar figures of reference refer to similar parts throughout the several views.

Figure 1 is a side elevation of the machine embodying my invention. Fig. 2 is a plan view of the machine. Fig. 3 is a cross-section on the line 3 3 of Fig. 2. Fig. 4 is a detail longitudinal section through the detail and feed-rolls. Fig. 5 is a cross-section on the line 5 5 of Fig. 4. Fig. 6 is a broken elevation showing the machine adapted for cutting another form of pick than is provided for by the arrangement shown in the preceding figures. Fig. 7 is a detail plan of the structure shown in Fig. 6. Fig. 8 is a detail elevation of the cam mechanism for shifting that part of the stock which is presented to the cutting-off knife. Fig. 9 a diagrammatic view of the stock after it is beveled or sharpened and after it is cut by the knife. Fig. 10 is a perspective view of one form of toothpick; and Fig. 11 is a view of another form of toothpick, the two forms of toothpick being the two styles cut by the machine, as illustrated.

The machine has a suitable frame 10 extending longitudinally, on which is a table 11, having its center part relieved, as shown at 12, to receive a strip of veneer stock. This stock, as usual in the manufacture of toothpicks, is cut so that the width of the veneer strip corresponds to the length of the toothpick and the thickness of the strip to the thickness of the pick at its thickest part. The table is covered by a suitable top 13, and through the table and top at necessary intervals are openings for the sharpeners and for the feed-rolls. The object of the table-top is to hold the stock flat, so that it can be acted on nicely by the sharpeners or planers and by the cutting-off knives. The initial feed of the stock as it is inserted in the slot or part 12 of the feed-table is by the positively-rotating feed-rolls 14, which turn in a direction to carry the stock through the machine, and the feed is also assisted by the feed-rolls 15, which follow the sharpeners or planers, to be presently referred to. The feed-rolls 14 and 15 are carried by transverse shafts 17 and 18, which, as usual in such cases, are mounted in vertically-adjustable boxes, and the shafts 17 and 18 are provided with worm-gears 19, (see Fig. 3,) which mesh with and are driven by worms 20 on the longitudinal shaft 21, which is journaled in the bearings 22 parallel with the feed-table and is provided with a pulley 23 or other driving means. Obviously the feed-rolls may be differently driven; but this makes a compact arrangement, especially as the shaft 21 is also arranged to carry the cutting-off knives, as hereinafter described.

Between the pairs of feed-rolls 14 and 15 are located the sharpeners or planers 24, which are like ordinary buzz-planers except that they are arranged to bevel the stock from near the center to the edge, as shown plainly in Fig. 3, and they operate on both the upper and lower sides of the stock, so as to make a true bevel, as will be seen by reference to the tooth-picks shown in Figs. 10 and 11. Between each pair of planers or sharpeners are the guide-rolls 26, which impinge on the upper and lower sides of the stock as it passes through the sharpener and so hold it steady. These guide-rolls 26 also act as a feeding means to force the stock through the planer. The planers or sharpeners are carried by parallel shafts 25 and are set up firmly against the guide-rolls 26 by means of nuts 27 or equivalent fastenings. The shafts 25 are mounted in vertically-adjustable bearings, as shown in Fig. 1, and they are provided with independent driving-pulleys 28. It is advisable to drive the planers independently of the mechanism which drives the feed-rolls, because it is necessary to drive them at a high speed, and it can be more conveniently done by independent driving means, as illustrated.

I have shown in Fig. 1 a convenient means for driving the shaft 25, in which a single belt 29 is arranged to pass around the upper pulley 28 and pass one side of the corresponding lower pulley, the belt being driven by a relatively large pulley 30, which is carried by a transverse shaft 31, having a suitable driving-pulley 32. To provide for tightening the belt 29, the shaft 31 is hung in swinging arms 33, which are pivoted as shown at 34, and a hand-screw 35 extends upward through the arm 33 and impinges on the upper part of the frame 10, so that by adjusting the screw the shaft 31 and pulley 30 may be moved so as to properly tighten the belt. Obviously any other suitable belt-tightener may be used or other means can be provided for driving the shafts without affecting the principle of the invention.

To provide for cutting off the picks smoothly, at the end of the table 11 I arrange a rotating cutter-head 36, which is carried by the shaft 21 and which at necessary intervals has inclined faces 37, to which are secured the knives 38, these being ground so as to shear by the end of the table 11 and make a very smooth cut. The knives are adjustable, as usual, on cutter-heads, this being best shown by reference to Fig. 3, where it will be seen that the knives have slots 39 to receive binding-screws 40, by which the knives are held to the cutter-head. The cutter-head and the feed of the machine are conveniently timed, as both are driven by the same shaft, and they are timed so that the feed will carry the stock just far enough over the table 11 for the knives to engage it and cut off toothpicks of the desired size.

As shown in Figs. 1, 2, and 3, the machine is arranged for cutting straight picks, as shown in Fig. 10; but there is a large call in the trade for what is known as "chisel-point" picks. (Shown in Fig. 11.) These are cut "butts and points," as shown by the diagram in Fig. 9. To provide for cutting picks of this kind I use the mechanism shown in Figs. 6 to 8—that is, I oscilate the stock slightly at the end which is presented to the knives, and the stock is sufficiently springy to permit such oscillation. I find the most convenient means is to have a section of the table oscillating, as shown in Fig. 7. Here the section $11^a$ of the table, which is a continuation of the part 11, is covered by a plate $13^a$, so as to leave the slot 12 as already described. This oscillating section, however, is secured to a sleeve 41, which is journaled in a suitable vertical bearing 42 and has a laterally-extending arm 43, carrying a roller 44, which engages the cam-groove 45 in a cam 46, the latter being fast to the shaft 21, already referred to. The cam-groove is made so as to oscillate the table-section slightly, as shown by dotted lines in Fig. 7, and the section is oscillated in one direction as one knife 38 passes it and back to the opposite position as the next knife passes it. Thus the stock will be moved slightly, as shown by the diagram in Fig. 9, and the picks $16^b$ will be produced. I find this arrangement for changing the shape of the pick a very nice one; but I do not limit myself to the precise mechanism shown for effecting such change, and obviously the peculiar style of the cutter-head may likewise be changed and the shape of the knives varied, if desired.

As previously stated, the object of this machine is to produce a very fine product, and I therefore provide the following means for drying and smoothing the picks, so that they will not be rough or splintery, as is frequently the case. To this end I arrange beneath the cutting end of the table 11 a vertical chute 47, slightly inclined at the bottom, which delivers the picks as they are cut upon an endless belt 48, carried by pulleys 49, only one of which is shown. This belt has between its two members steam-pipes 50 or other heating means, which heating means is inclosed in a casing $50^a$. Above and parallel with the belt 48 is a second belt 51, which moves, however, in the opposite direction, as shown by the arrows in Fig. 1, and the shafts 52 and 53, which carry the belts 48 and 51, are moved by a short belt 54 or equivalent driving means. I have found in practice that by having the lower belt 48 move faster than the other the toothpicks will be rumbled or rolled against one another, will be kept straight, and will be slowly carried toward the lower end of the polishing and drying device. It will be observed by reference to Fig. 1 that the whole drying arrangement is slightly inclined and it is made long enough so that when the picks come out at the lower end they are dry.

Having thus described my invention, what I claim as new, and desire to secure by Letters Patent, is—

1. A toothpick-machine, comprising a feed-table, means for feeding the stock flat across the table, a sharpening device to engage and sharpen the edges of the stock, feeding and guiding means alining with the sharpening devices transversely of the stock, and a rotary cutter journaled adjacent to the table end with its axis parallel with the feed of the stock, said cutter having a series of knives which shear across the table end.

2. A machine of the kind described, comprising a feed-table, means for feeding the stock over the table, a buzz-planer engaging the stock edges to sharpen them, guides engaging the middle portion of the stock as it passes through the planer, and a cutter arranged to shear across the table and sever the stock.

3. A machine of the kind described, comprising a feed-table, sharpening means engaging the edge of the stock as it is fed across the table, guiding and feeding devices engaging the stock in transverse alinement with the sharpening means, and a rotating cutter-head supported at one side of the table out of longitudinal alinement with the stock-feed, and having a series of knives which shear across the table to cut off the stock.

4. A machine of the kind described, comprising a feed-table, a feeding means arranged to hold the stock flat on the table, said feeding means being arranged between the cutting portions of the buzz-planer, a buzz-planer engaging the stock edges to sharpen them, and a cutter-head rotating at one side of the table, the said cutter-head having knives which shear across the table and sever the stock.

5. A machine of the kind described comprising a stationary feeding-table having means for receiving and guiding the stock in flat condition across the table, a sharpening device to engage the edges of the stock and sharpen them as it passes over the table, an oscillating table-section having guiding means for the stock and forming a continuation of the stationary table, and a cutter with its axis parallel with the stock-feed and arranged to shear across the oscillating table-section and sever the stock.

6. In a toothpick-machine, the combination with the stationary table having means for guiding stock thereon and the oscillating table-section having stock-guiding means, the oscillating section and its guiding means forming a continuation of the stationary table and guiding means, and a cutter-head having knives of different pitch, the said cutter-head turning on an axis parallel with the travel of the stock and having knives of varying pitch arranged to shear across the oscillating table-section to sever the stock.

In testimony whereof I have signed my name to this specification in the presence of two subscribing witnesses.

WILLIAM F. HUTCHINSON.

Witnesses:
J. G. DUNBAR,
JOHN CAROLAN.